Figure 10:
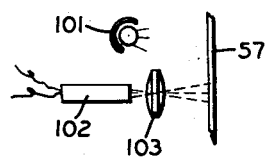

March 29, 1960 — L. G. SIMJIAN — 2,930,296
APPARATUS FOR COLLECTING AN ARTICLE FOR DEPOSIT
Filed Dec. 12, 1958 — 3 Sheets-Sheet 1
FIG. 1
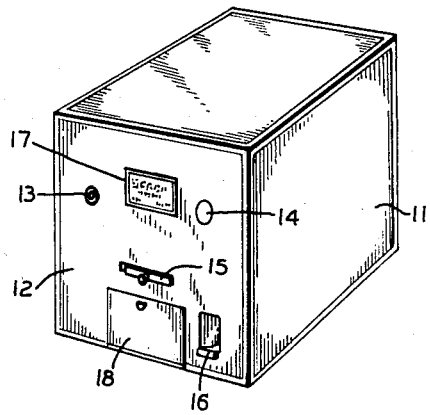
FIG. 3
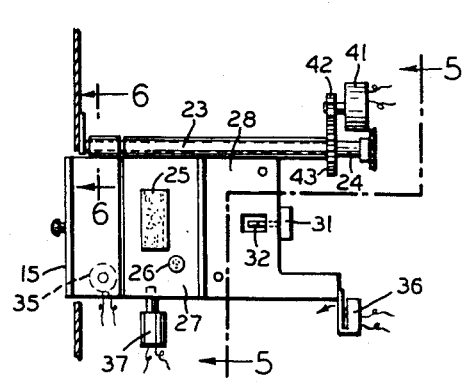
FIG. 2
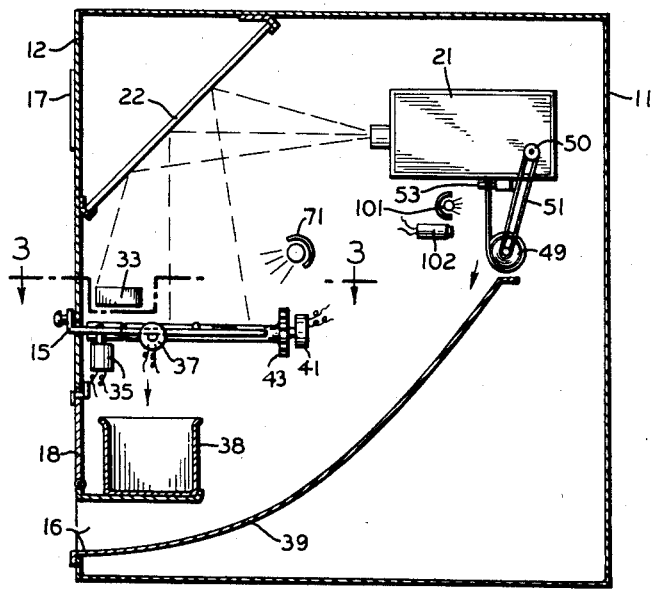
FIG. 4
INVENTOR.
LUTHER G. SIMJIAN
BY
AGENT.

March 29, 1960  L. G. SIMJIAN  2,930,296
APPARATUS FOR COLLECTING AN ARTICLE FOR DEPOSIT
Filed Dec. 12, 1958  3 Sheets-Sheet 2
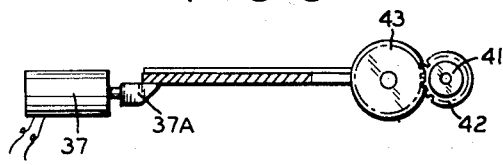
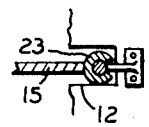
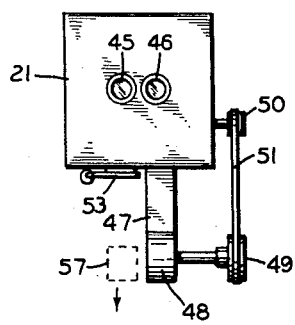
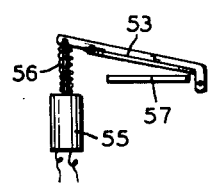
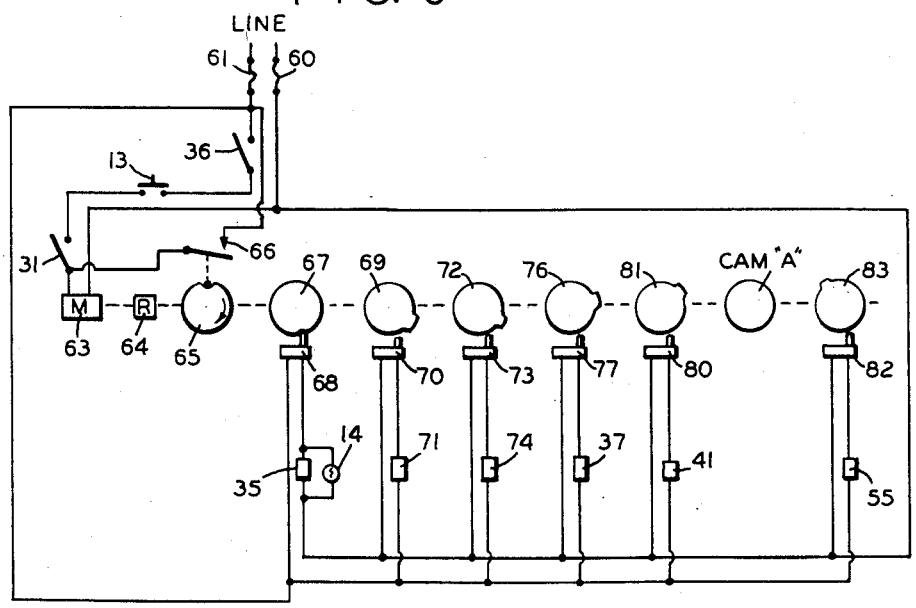
INVENTOR.
LUTHER G. SIMJIAN
BY
AGENT.

March 29, 1960     L. G. SIMJIAN     2,930,296
APPARATUS FOR COLLECTING AN ARTICLE FOR DEPOSIT Filed Dec. 12, 1958     3 Sheets-Sheet 3

*INVENTOR.*
LUTHER G. SIMJIAN
BY
Ervin B. Steinberg
AGENT.

United States Patent Office 2,930,296
Patented Mar. 29, 1960

2,930,296
APPARATUS FOR COLLECTING AN ARTICLE FOR DEPOSIT

Luther G. Simjian, Greenwich, Conn.

Application December 12, 1958, Serial No. 779,976

22 Claims. (Cl. 95—1.1)

This invention generally refers to apparatus for collecting articles, and more specifically has reference to apparatus for collecting an article for deposit whereby a plurality of receipts is made, one receipt being issued to the depositor and another receipt being stored within the apparatus. More specifically, the receipt provided by the instant arrangement carries an image of the article deposited and such other and necessary informition as to relate the receipt issued with the depositor and with the receipt stored.

The collection of certain articles as for instance coupons, certificates or money bills for such purposes as Christmas clubs, vacation clubs, saving plans and similar projects presents considerable problems, one of these being the large number of customers causing a great deal of manual and clerical labor in relation to the monetary value per single transaction. Yet, proper collection and accurate crediting of each account is not only of paramount importance but also a legal requirement. One of the complications with respect to automated collection resides in the fact that the articles enumerated above are substantially identical. The instant invention describes a method and apparatus which overcomes this and other known problems by providing fully automatic means for maintaining the identity of the customer, by producing a photographic image of the article deposited, and finally, by providing a similar photographic receipt to the customer. Additional means assure that the receipt is correlatable with respect to the article deposited and with the photographic receipt retained by the collecting apparatus.

One of the objects of this invention is therefore the provision of an improved apparatus for collecting articles avoiding one or more of the disadvantages and limitations of prior art arrangements.

Another object of this invention is the provision of a means for collecting for deposit substantially alike articles from a plurality of depositors.

Another object of this invention is the provision of apparatus for collecting an article for deposit whereby a photographic receipt is issued to the depositor while maintaining the identity of the depositor for record purposes.

Still another object of this invention is the provision of a collecting apparatus which is adapted to receive an article for storage and which supplies a plurality of photographic receipts, one of the receipts becoming stored within the apparatus and another one being issued to the depositor.

A further object of this invention is the provision of apparatus for collecting an article wherein a photographic image is made of the article deposited and of data identifying the depositor, the photographic image becoming stored within the apparatus while a duplicate image, serving as a receipt, is supplied to the depositor.

Another and further object of this invention is the provision of apparatus for collecting substantially alike articles while maintaining the identity of the depositor, yet identifying each article with the correct deposit.

Another and still further object of this invention is the provision of a fully automated device for collecting money bills, coins, and similar articles which are substantially alike, yet providing graphic proof of the deposit and maintaining the identity of the depositor.

Figure 11:
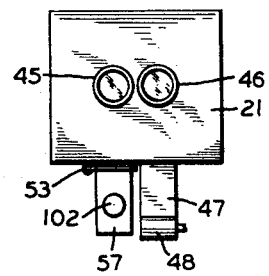
Figure 12:
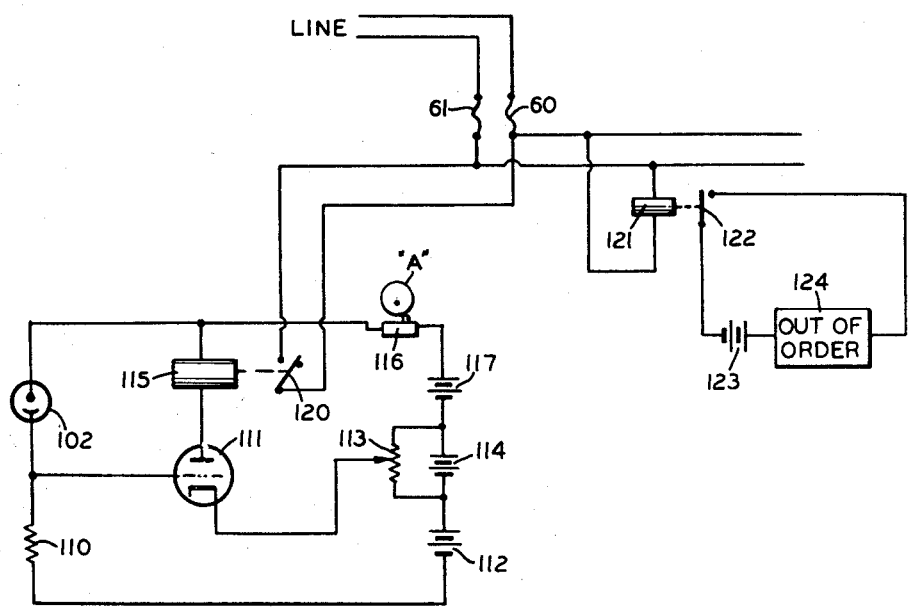

Other and still further objects of this invention will be apparent from the following description taken in conjunction with the accompanying drawings in which:

Figure 1 is a perspective view of the apparatus;
Figure 2 is an elevational view, partly in section, illustrating the spatial arrangement of most operational elements;
Figure 3 is a plan view along lines 3—3 of Figure 2;
Figure 4 is a plan view of an identification means which may be used in conjunction with the apparatus;
Figure 5 is a detail view, partly in section, of the slide release indicated in Figures 2 and 3;
Figure 6 is a sectional view along lines 6—6 in Figure 3;
Figure 7 is a front close-up view of the camera;
Figure 8 is an enlarged side view, partly schematic, of the receipt severing means;
Figure 9 is a schematic electrical circuit diagram for effecting operation of the instant apparatus;
Figure 10 is an elevational view, partly schematic, showing on an enlarged scale, verifying means indicated in Figure 2;
Figure 11 is a front view of the camera means including the verifying means depicted in Figure 10, and
Figure 12 is a schematic electrical circuit diagram showing the auxiliary circuit necessary to use the verifying means.

Referring now to the figures and Figure 1 in particular, numeral 11 identifies an enclosure which houses substantially all of the elements of the apparatus. A front panel 12 is equipped with a start push button switch 13, an indicating lamp 14 and an extendable slide 15 which is designed to receive, when extended out of the enclosure, the article or articles to be deposited. A receipt furnished by the apparatus is made available to the depositor at an aperture 16. A label 17 may be mounted on the front panel to provide suitable step-by-step operating instructions. The articles collected by the instant device may be removed by authorized personnel via an access door 18 which of course, is provided with suitable safety and locking means.

The relation of the various elements is shown more clearly in Figures 2 and 3. The extendable slide 15 is disposed within the apparatus so that any contents placed thereon are in view of camera 21 by means of an inclined reflecting mirror 22. The slide is hingedly supported by being attached to tubing 23 which slides in longitudinal direction along shaft 24 and also rotates thereabout when a deposit is being effected.

For operating the device, the slide 15 is pulled out of the enclosure 11 and an article, such as a coupon or a money bill 25 and a coin 26 for instance, are placed on the forward compartment 27 of the slide. The rear compartment 28 is adapted to receive an identification means, such as a plate or card 29 (Figure 4), which may contain, in the form of imprinted or embossed letters, the name and account number of the depositor. Moreover, the identification means 29 may be keyed by pins, recesses, serrated edges, etc. to engage corresponding keying means on the rearward slide portion 28. For the purpose of illustration, a set of engaging pins and corresponding apertures is depicted. The presence of identification means 29 on the slide is sensed by a switch 31 which is equipped with a sensing leaf spring 32 engaging the identification means 29 through a suitable aperture in the slide. When the depositor has placed the article or articles to be deposited and the identification means on the slide, the slide is moved into the enclosure whereby tubing 23 slides in longitudinal direction along shaft 24, Figures 3 and 6. The articles 25 and 26, as well as the identification means which identify the depositor, are now in view of camera 21. Moreover, an electrically driven digital time clock or a searilizing device 33 is disposed above the slide so as to be in view of the camera lens, thereby giving the deposit a serial number, a date, a time indication, other identificable coding or an indicia display in general. Solenoid 35 by means of suitable apertures means in the slide serves to lock the slide in its "in" position after start push button switch 13 has been actuated to prevent withdrawal of the deposit when the apparatus is in operation. Limit switch 36 ascertains that the slide is in its full inward position before the aparatus can start.

Camera 21, as explained hereinbefore, is used to take a complete or partial photographic image of the articles on the slide in order to provide unmistakable proof as to the nature of the article which has been inserted into the apparatus. As soon as the camera has performed its operation, solenoid 37 (shown more clearly in Figure 5) attached to a latch 37A is actuated to release the slide, thereby causing portions 27 and 28 to pivot about the axis of shaft 24 to effect dropping of articles 25 and 26 into receptable 38 which is mounted underneath slide portion 27 and simultaneously causing identification means 29 to slide off the slide portion 28 and fall onto inclined chute 39 thereby being returned to the depositor at aperture 16. After a certain number of collections or after the passing of a predetermined time interval, receptacle 38 may be removed from the apparatus by opening access door 18. The rotated slide portions subsequently are returned to their horizontal position by means of a rotary solenoid 41 attached to gear 42 which meshes with gear 43, the latter being fastened to tubing 23.

Camera 21 preferably is a motor operated device which includes film windup after each exposure. For the instant purpose, the camera (Figure 7) is provided with a two lens system, numerals 45 and 46, both lens systems providing substantially the same picture on dual negative or positive printing papers as will be explained hereafter. One of the photographic images, specifically the image provided by lens system 46 and appearing on photographic medium 47, remains stored within the apparatus by being wound on roll 48 which is driven from motor means (not shown) via pulleys 49 and 50, and a spring belt 51 in order to provide for variable takeup. The other photographic image, provided by lens system 45, after being ejected from the camera 21, is severed by a cutter knife 53 and thereby is caused to fall onto inclined chute 39 (Figure 2) to become accessible to the depositor at aperture 16.

In this manner the depositor obtains a receipt which is a photographic print depicting an image of the articles placed on the tray and showing also the identification information 29 and 33 seen by camera 21.

The camera presented in block form may be of several designs as for instance, it may embody the principle of the cameras commercially known as "Polaroid Land Process" wherein a positive print is made within 60 seconds. Moreover, the camera may utilize the principle used in the "Microfilm Printer" made by the Minnesota Mining and Manufacturing Company using sensitized paper, a liquid and electrical energy to provide within less than one minute a positive enlarged print of the information usually seen on microfilm. Furthermore, fast processing methods as available in automated photographic portrait vending apparatus may be used in order to provide quickly photographic images, which may be either negative or positive prints. Still further, developing and processing techniques may be used as are revealed in the U.S. patents to Luther G. Simjian, No. 1,918,061 issued July 11, 1933, entitled "Negative Developing and Printing Device," and No. 1,952,100, issued Mar. 27, 1934, entitled "Process of Producing Photographic Proof Prints."

It will be obvious to those skilled in the art that instead of the double lens system indicated, image splitting means such as prisms or lenses may be used to effect two separate photographic images. Still further, it will be possible, without deviating from the principle of the invention described, to render a first negative or positive image and then by automatic processing means furnish a duplicate print to the depositor.

The mechanism of the cutting knife is shown more clearly in Figure 8 wherein a solenoid 55 is used to actuate the knife 53. A spring 56 or other suitable biasing means maintains the knife in the normally open position. Numeral 57 identifies the medium containing the photographic image normally dispensed to the depositor. For the sake of clarity the supporting base has been omitted.

The electrical circuit for the foregoing apparatus is indicated in Figure 9 wherein fuses 60 and 61 connect the apparatus to line voltage. Switch 36 becomes closed when the slide is in its full "in" position and switch 31 becomes closed when the identification means 29 are placed on the slide. When depressing start push button 13, electrical energy is supplied from the line via fuse 61, switches 36, 13, 31 and from the line via fuse 60 to motor 63 which via a gear reducer 64 drives a series of timing cams. As soon as motor 63 runs, timing cam 65 is rotated which closes switch 66 for one complete operating cycle to shunt the circuit branch which includes start push button 13. Cam 67 via switch 68 energizes solenoid 35 to maintain the slide in its locked position while the operating cycle is in progress. Simultaneously, indicating lamp 14 on the front panel becomes energized to indicate to the depositor that the machine is operating. A short interval later, cam 69 actuates switch 70 which in turn energizes illumination means 71 (see Figure 2) to provide suitable illumination to the articles placed on the slide. While illumination means 71 are energized, cam 72 via switch 73 energizes the operating mechanism 74 of the camera 21. This operating mechanism 74 comprises mainly the shutter and film windup in camera 21. A brief period thereafter, cam 76, via switch 77 energizes solenoid 37 to release the rotatable slide portions thereby causing pivotal motion of these portions and cause articles 25 and 26 to fall into receptacle 38 and return to the depositor the identification means via chute 39. Rotary solenoid 41, actuated via switch 80 and cam 81, restores the slide portions to their horizontal position and finally, cutter solenoid 55 becomes energized via switch 82 and cam 83 causing photographic medium 57 which carries an image and thereby forms a receipt for the depositor, to become severed and rendered accessible to the depositor via chute 39 and aperture 16. The foregoing circuit is provided with one further cam "A" which may be used for verification purposes as will be described later in connection with Figures 10 through 12.

It will be seen that the above device may be used for accepting an article for deposit and for providing photographic images of the article, one photographic image becoming stored within the apparatus, the other image being rendered to the depositor and both images being correlatable by means of the serial number, the identification means or other means which may be provided within the apparatus. Still further it will be apparent that the photographic images, serving as receipts, can be correlated with the depositor by means of the identifying means 29. It will of course, be understood by those skilled in the art that the photographic medium if desired, may be preprinted with serialized numbers and that the media which are synchronized to provide identical numbering. Instead of photographic means and a sensitized emulsion, electronic scanning or xerography may be substituted without deviating from the principle described hereinbefore.

The basic apparatus described above may readily be modified to include means which verify the existence of a photographic image. This task may be accomplished in many ways, but a rather simple and one preferred method is shown hereafter. When providing the apparatus with a camera which produces positive photographic prints it is possible to scan the photographic medium for the presence of a grey image. If no exposure has taken place or if there was some failure in processing, the photographic medium will be white instead of grey or black.

In order to detect the existence of a photographic image, a source of light 101 and photoelectric sensing means 102, see Figures 2 and 10, are disposed so that sensing means 102 receives reflected light from photographic medium 47 or 57 respectively. When desired, a lens 103 or a color filter may be used.

Figure 11 depicts camera 21 with photoelectric means 102 disposed for communication with photographic medium 57. It will be obvious to those skilled in the art that the same or similar scanning means may be provided to communicate with photographic medium 47, or when producing negative prints, transmitted light instead of reflected light may be utilized.

The circuit necessary to incorporate the verifying means in the electrical circuit diagrams per Figure 9 is shown in Figure 12. Photoelectric sensing means 102 is connected from the control electrode of an electron tube 111 to voltage source 117. Voltage sources 112 and 114 apply via adjustable resistor 113 and fixed resistor 110 a negative bias between the control electrode and cathode of tube 111. The anode of the tube is connected also in series with the coil 115 of an electrical relay and circuit switch 116 to source 117. Cam "A" provided in the timing arrangement of Figure 9 and adapted to close switch 116 is phased in such a manner that voltage is applied to tube 111 just prior to the operation of rotary solenoid 41 and of cutting knife 53. The slider on resistor 113 is adjusted so that tube 111 will not conduct sufficient current for energizing relay 115 when only a small amount of reflected light is received by photoelectric means 102. When however no photographic image is present on medium 57, a much larger amount of light is reflected from the white photographic medium and photoelectric means 102 is rendered conductive. In this event, the control electrode of tube 111 becomes less negative causing the tube 111 to conduct thereby energizing relay 115 and causing associated contact 120 to become closed. The closing of relay contact 120 establishes a short-circuit across the line thereby causing either fuse 60 or fuse 61, or both, to burn out thereby removing electrical energy from the entire apparatus and rendering the collecting apparatus inoperative.

When the electrical energy has been removed from the apparatus, no-voltage relay 121 closes contact 122 thereby energizing via battery 123 an "out of order" lamp 124 indicating to the depositor or to prospective depositors that the device is no longer operable. Obviously, the sign may instruct the depositor to remove his deposit from the slide as the deposit has not been moved into the receptacle. In this manner, the depositor can recover his deposit and is not issued a receipt. Moreover, the machine by not having provided a receipt, is taken out of operation, further malfunctioning is avoided and proper investigation can be made why a photographic image was not obtained.

It will be apparent that many other and similar circuits may be provided to achieve substantially the same result, that is, ascertaining the existence of a photographic image prior to providing a receipt. A further solution possible is the placing of suitable markings on the slide and adjusting the photoelectric means so as to sense or detect the existence of a photographic image of the special markings. These markings may be similar to the colored registration markings well-known in the printing industry.

In general, it will be apparent that the foregoing method and apparatus provide a relatively simple and inexpensive means for collecting articles for deposit. The device is fully automatic thereby achieving great economy and savings in the collection of various deposits. Although there have been described certain articles, which are alike in appearance, it will be apparent that other articles may be deposited as for instance, watches for repair and many other objects too numerous to describe. In each instance the apparatus described offers the advantages indicated.

While there have been described certain embodiments of the present invention, it will be apparent to those skilled in the art that various changes and modifications may be made therein without deviating from the principle and intent of the present invention which shall be limited only by the scope of the appended claims.

What is claimed is:

1. In an apparatus for collecting an article for deposit including photographic means the combination of: support means on said apparatus adapted to receive an article for deposit and storage and adapted to support also depositor identifying means; said photographic means disposed to view the support means and said article and depositor identifying means thereon; means actuating said photographic means to produce on a photographic medium an image of the article and of the identifying means; means delivering the photographic medium containing the images of the article and the identifying means to a position which is accessible from the exterior of the apparatus, and means causing said article to be stored within said apparatus to prevent its surreptitious removal subsequent to the actuation of the photographic means.

2. In an apparatus for collecting an article for deposit which includes photographic means and indicia display means the combination of: support means on said apparatus adapted to receive depositor identifying means and an article intended for deposit and storage; the photographic means disposed to view said indicia display means, the article and the depositor idetnifying means; means actuating said photographic means to produce on a photographic medium an image of said article, of the depositor identifying means and of the indicia display means; means delivering the photographic medium containing the recorded images to a position which is accessible from the exterior of the apparatus, and means causing the article to be moved from said support means to a storage position within said apparatus thereby rendering said article inaccessible for surreptitious removal subsequent to the image thereof having been recorded.

3. In an apparatus for collecting an article for deposit including image recording means the combination of: aperture means on said apparatus adapted to receive an article for deposit and storage; means causing said atricle to be scanned by said recording means after having been received by said aperture means and said recording means being actuated to produce a plurality of recorded images of the article; means storing one of the recorded images of the article within the apparatus while delivering another of said images to a position which is accessible from the exterior of the apparatus, and means causing said article to be stored within said apparatus to prevent its surreptitious removal subsequent to the actuation of the image recording means.

4. In an apparatus for collecting an article for deposit including photographic means the combination of: aperture means on said apparatus adapted to receive an article for deposit and storage; means causing said article to be in view of said photographic means after having been received by said aperture means and said photographic means being actuated to produce on a protographic medium a plurality of images of the article; means storing one of the images of the article within said apparatus while delivering the medium containing another image of the article to a position which is accessible from the exterior of the apparatus, and means causing said article to be stored within said apparatus to prevent its surreptitious removal subsequent to the actuation of the photographic means.

5. In an apparatus for collecting an article for deposit including photographic means the combination of: support means on said apparatus adapted to receive an article for deposit and storage and adapted to support also depositor identifying means; said photographic means disposed to view the support means and said article and depositor identifying means thereon; means actuating said photographic means to produce on a photographic medium a first and a second image, each showing the article and the identifying means; means storing the photographic medium containing the first image within said apparatus while delivering the photographic medium containing the second image to a position which is accessible from the exterior of the apparatus, and means causing said article to be stored within said apparatus to prevent its surreptitious removal subsequent to the actuation of the photographic means.

6. In an apparatus for collecting an article for deposit which includes photographic means and indicia display means the combination of: support means on said apparatus adapted to receive depositor identifying means and an article intended for deposit and storage; the photographic medium a first and a second image, each showing the article and the depositor identifying means; means actuating said photographic means to produce on a photograph medium a first and a second image, each showing the article, the depositor identifying means and the indicia display means; means storing the first image within said apparatus while delivering the second image to a position which is accessible from the exterior of the apparatus, and means causing the article to be moved from said support means to a storage position within said apparatus thereby rendering the article inaccessible for surreptitious removal subsequent to an image thereof having been recorded.

7. In an apparatus for use by a depositor including image recording means the combination of: article support means accessible to the depositor which are adapted to receive from said depositor for display thereupon and deposit in the apparatus documents and coin money; means causing said documents and coin money in received and displayed disposition to be scanned by said image recording means and said image recording means being actuated to record an image of said displayed documents and coin money; means causing said documents and coin money to be moved to a storage receptacle subsequent to an image thereof having been recorded thereby preventing surreptitious removal of the deposited documents and coin money; and means for operating a mechanism to issue a receipt to the depositor in response to the operation of the image recording means, the receipt showing an image of the documents and coin money as viewed by said image recording means.

8. An apparatus as set forth in claim 7 wherein said image recording means comprises photographic means photographing the displayed documents and coin money on a single frame of a photo-sensitive recording medium.

9. In an apparatus for use by a depositor including a changing indicia display and image recording means the combination of: support means accessible to the depositor which are adapted to support for display a plurality of articles intended for deposit within the apparatus; means supporting also depositor identification means; the image recording means disposed to view said articles, said identification means and said display means; means rendering said identification means and plurality of articles inaccessible to the depositor while actuating said recording means to cause a recorded image of said articles, of the identification means and of said indicia display means; means causing said plurality of articles to be moved to a storage receptacle for deposit subsequent to the image thereof having been recorded; means causing said depositor identification means to be rendered accessible again to the depositor after an image thereof having been recorded, and means causing a receipt to be issued to the depositor, the receipt showing an image of said indicia display, of said identification means and of said plurality of articles as viewed by said recording means.

10. An apparatus as set forth in claim 9 wherein a further receipt showing the display viewed by said image recording means is provided and stored within the apparatus.

11. In an apparatus for collecting an article for deposit including image recording and reproducing means the combination of: aperture means on said apparatus adapted to receive an article for deposit and storage; means causing said article to be scanned by said recording means after having been received by said aperture means and said recording means being actuated to produce a pictorial record of the article; means delivering in response to the operation of the recording means the record of the article produced by said recording means from said latter means to a position which is accessible from the exterior of the apparatus, and means causing said article to be stored within said apparatus to prevent its surreptitious removal subsequent to the actuation of the image recording means.

12. In an apparatus for collecting an article for deposit including photographic means the combination of: aperture means on said apparatus adapted to receive an article for deposit and storage; means causing said article to be in view of said photographic means after having been received by said aperture means and said photographic means being actuated to reproduce on a photographic medium an image of the article; means delivering in response to the operation of the photographic means the photographic medium containing the image of the article reproduced by said photographic means from said latter means to a position which is accessible from the exterior of the apparatus, and means causing said article to be stored within said apparatus to prevent its surreptitious removal subsequent to the actuation of the photographic means.

13. An apparatus for collecting an article for deposit comprising: aperture means on said apparatus adapted to receive an article for deposit and storage; image recording means capable of producing a visible image operatively associated with said apparatus; means causing said article to be scanned by said recording means after having been received by said aperture means; means actuating the recording and image producing means to cause on a recording medium an image of the article; means coacting with said apparatus for scanning the recording medium subsequent to the actuation of the recording means to sense the presence of an image on the medium and render the apparatus inoperative in the absence of such an image; means delivering the recording medium containing the article image to a position which is accessible from the exterior of the apparatus, and means causing said article to be stored within said apparatus to prevent its surreptitious removal subsequent to the actuation of the image recording means.

14. An apparatus for collecting an article for deposit comprising: aperture means on said apparatus adapted to receive an article for deposit and storage; photographic means capable of producing a visible image operatively associated with said apparatus; means causing said article to be in view of said photographic means after having been received by said aperture means; means actuating said photographic and visible image producing means to cause on a photographic medium an image of the article; light responsive sensing means disposed on said apparatus and actuated to sense the presence of an image on said photographic medium subsequent to the actuation of the photographic means and to prevent further operation of the apparatus in the absence of a visible image; means delivering the photographic medium containing the article image to a position which is accessible from the exterior of the apparatus, and means causing said article to be stored within said apparatus to prevent its surreptitious removal subsequent to the actuation of the photographic means.

15. An apparatus for collecting an article for deposit comprising: aperture means on said apparatus adapted to receive an article for deposit and storage; image recording means capable of producing a visible image operatively associated with said apparatus; means causing said article to be scanned by said recording means after having been received by said aperture means; means actuating the recording and image producing means to cause on portions of a recording medium a set of images of the article; means coacting with said apparatus for scanning portions of the recording medium subsequent to the actuation of the recording means to sense the presence of an image on the medium and prevent further operation of the apparatus in the absence of such an image; means storing a portion of the recording medium showing one article image within said apparatus while delivering a portion containing the other article image to a position which is accessible from the exterior of the apparatus, and means causing said article to be stored within said apparatus to prevent its surreptitious removal subsequent to the actuation of the image recording means.

16. An apparatus for collecting an article for deposit comprising: aperture means on said apparatus adapted to receive an article for deposit and storage; photographic means capable of producing a visible image operatively associated with said apparatus; means causing said article to be in view of said photographic means after having been received by said aperture means; means actuating said photographic and visible image producing means to cause on a photographic medium a first and a second image of the article; light responsive sensing means disposed on said apparatus and actuated to sense the presence of at least one of said images on said photographic medium subsequent to the actuation of the photographic means and to prevent further operation of the apparatus in the absence of a visible image; means storing the medium showing one of said article images within said apparatus while delivering the photographic medium containing the other article image to a position which is accessible from the exterior of the apparatus, and means causing said article to be stored within said apparatus to prevent its surreptitious removal subsequent to the actuation of the photographic means.

17. In an apparatus for collecting an article for deposit which includes image recording and reproducing means the combination of: aperture means on the apparatus adapted to accept and store within said apparatus an article which is being exchanged for a receipt to be issued therefrom; means causing the article to be in view of the image recording means; means actuating the recording means to produce a pictorial record of the accepted article, and means for operating a mechanism to issue a receipt in response to the acceptance of the article, the receipt bearing the produced record of the article as provided by said recording means.

18. In an apparatus for use by a depositor including image recording and reproducing means the combination of: article support means accessible to the depositor for depositing thereupon an article which is being exchanged for a receipt; means causing said support means to be viewed by the image recording means; means actuating said recording means to produce a pictorial record of the article; means causing said article to be moved from the support means to a storage receptacle subsequent to an image thereof having been recorded, and means for operating a mechanism to issue a receipt accessible to the depositor in response to the operation of the image recording and reproducing means, the receipt bearing the pictorial record of the article produced by said recording means.

19. An apparatus as set forth in claim 18 wherein said mechanism provides a further receipt which is stored as a record within the apparatus.

20. In an apparatus for use by a depositor including image recording and reproducing means the combination of: article support means accessible to the depositor for depositing thereupon a plurality of separate articles which are being exchanged for a receipt; means causing said support means to be viewed by the image recording means; means actuating said recording means to produce a pictorial record of said articles as arranged by said depositor upon said support means; means causing said articles to be moved from said support means to a storage receptacle subsequent to an image thereof having been recorded, and means for operating a mechanism to issue a receipt responsive to the receipt of said articles, the receipt bearing a pictorial record of the plurality of articles as produced by said recording means.

21. In an apparatus for use by a depositor including image recording and reproducing means the combination of: article support means accessible to the depositor which are adapted to receive for display and deposit a plurality of separate articles to be deposited within the apparatus; means causing said articles in their displayed relation to be viewed by the image recording means; means actuating said recording means to produce a pictorial record of the displayed articles; means causing said articles to be moved to a storage receptacle subsequent to an image thereof having been recorded thereby preventing surreptitious removal of the articles accepted for deposit, and means for operating a mechanism to issue a receipt to the depositor in response to the operation of the image recording means, the receipt bearing a pictorial record of the plurality of articles as viewed and reproduced by said recording means.

22. In an apparatus for use by a depositor including image recording and reproducing means the combination of: article support means accessible to the depositor which are adapted to receive from said depositor for display thereupon and deposit in the apparatus a plurality of separate articles; means causing said plurality of articles to be viewed by said image recording means; means actuating said recording means to produce on a single frame of a recording medium a pictorial record of the articles; means causing said articles to be moved to a storage receptacle subsequent to an image thereof having been recorded; and means for operating a mechanism to issue a receipt to the depositor subsequent to the operation of the image recording means, the receipt bearing a pictorial record of said articles as produced by said image recording and reproducing means.

References Cited in the file of this patent

UNITED STATES PATENTS

| | | |
|---|---|---|
| 1,682,931 | Pifer | Sept. 4, 1928 |
| 2,210,472 | Strotmann | Aug. 6, 1940 |
| 2,335,956 | Oiler | Dec. 7, 1943 |
| 2,371,542 | Place | Mar. 13, 1945 |
| 2,473,174 | Pifer | June 14, 1949 |
| 2,796,812 | Koci | June 25, 1957 |

UNITED STATES PATENT OFFICE

CERTIFICATE OF CORRECTION

Patent No. 2,930,296                            March 29, 1960

Luther G. Simjian

It is hereby certified that error appears in the printed specification of the above numbered patent requiring correction and that the said Letters Patent should read as corrected below.

Column 3, line 6, for "searilizing" read -- serializing --; line 9, for "identificable" read -- identifiable --; column 6, line 36, for "idetnifying" read -- identifying --; line 50, for "said atricle" read -- said article --; column 7, line 23, for "medium a first and a second image, each showing" read -- means disposed to view the indicia display means, --.

Signed and sealed this 20th day of September 1960.

(SEAL)
Attest:

KARL H. AXLINE                                        ROBERT C. WATSON
Attesting Officer                                     Commissioner of Patents